US012632253B2

(12) United States Patent
Zhu et al.

(10) Patent No.: US 12,632,253 B2
(45) Date of Patent: May 19, 2026

(54) LOGICAL HADAMARD GATE OPERATION AND GAUGE FIXING IN SUBSYSTEM CODES

(71) Applicant: International Business Machines Corporation, Armonk, NY (US)

(72) Inventors: Guanyu Zhu, Ossining, NY (US); Andrew W. Cross, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 962 days.

(21) Appl. No.: 17/121,142

(22) Filed: Dec. 14, 2020

(65) Prior Publication Data

US 2022/0188112 A1     Jun. 16, 2022

(51) Int. Cl.
*G06N 10/70* (2022.01)
*G06F 8/41* (2018.01)
*G06F 9/30* (2018.01)
*G06N 10/60* (2022.01)

(52) U.S. Cl.
CPC ............ *G06F 9/30029* (2013.01); *G06F 8/44* (2013.01); *G06N 10/60* (2022.01); *G06N 10/70* (2022.01)

(58) Field of Classification Search
CPC ....... G06F 9/30029; G06F 8/44; G06N 10/60; G06N 10/70
See application file for complete search history.

(56) References Cited

U.S. PATENT DOCUMENTS

| | | | |
|---|---|---|---|
| 10,248,491 B1* | 4/2019 | Zeng ................... | G06F 11/1048 |
| 2007/0250280 A1 | 10/2007 | Beausoleil et al. | |
| 2010/0251049 A1* | 9/2010 | Goto .................... | H03M 13/19 |
| | | | 714/E11.032 |
| 2018/0032894 A1* | 2/2018 | Epstein ................. | G06N 10/40 |

(Continued)

FOREIGN PATENT DOCUMENTS

| | | |
|---|---|---|
| AU | 2021402531 A1 | 5/2023 |
| CN | 110443370 A | 11/2019 |

(Continued)

OTHER PUBLICATIONS

De las Cuevas, Gemma, et al. "Quantum algorithms for classical lattice models." New Journal of Physics 13.9: 093021. (Year: 2011).*

(Continued)

*Primary Examiner* — Beau D Spratt
(74) *Attorney, Agent, or Firm* — Amin, Turocy & Watson, LLP

(57) ABSTRACT

Systems, computer-implemented methods, and computer program products to facilitate logical Hadamard gate operation and gauge fixing in subsystem codes are provided. According to an embodiment, a system can comprise a processor that executes computer executable components stored in memory. The computer executable components can comprise a gauge fixing component that applies a gauge fixing operation to a subsystem code of an encoded qubit to generate a switched subsystem code. The computer executable components can further comprise a transverse component that applies a transversal Hadamard operation to the switched subsystem code to generate a rotated subsystem code.

25 Claims, 16 Drawing Sheets

(56) References Cited

U.S. PATENT DOCUMENTS

| | | | | |
|---|---|---|---|---|
| 2019/0042392 A1* | 2/2019 | Matsuura | ............... | G06N 10/00 |
| 2019/0044543 A1 | 2/2019 | Chamberland et al. | | |
| 2019/0296211 A1* | 9/2019 | Chow | .................... | G06N 10/40 |
| 2020/0341837 A1* | 10/2020 | Cross | .................... | G06N 10/40 |
| 2021/0374588 A1* | 12/2021 | Gidney | ................. | G06F 11/004 |
| 2023/0205622 A1* | 6/2023 | Cross | .................... | G06N 10/40 |

FOREIGN PATENT DOCUMENTS

| | | | |
|---|---|---|---|
| CN | 116508032 A | 7/2023 | |
| EP | 4260248 A1 | 10/2023 | |
| JP | 2023-553908 A | 12/2023 | |
| KR | 2019-0007375 A | 1/2019 | |
| WO | 2020/056176 A1 | 3/2020 | |
| WO | 2020/216578 A1 | 10/2020 | |
| WO | 2022/128868 A1 | 6/2022 | |

OTHER PUBLICATIONS

Debroy, Dripto M., et al. "Logical performance of 9 qubit compass codes in ion traps with crosstalk errors." Quantum Science and Technology 5.3: 034002. (Year: 2020).*

Paetznick, Adam, and Ben W. Reichardt. "Universal fault-tolerant quantum computation with only transversal gates and error correction." Physical review letters 111.9: 090505. (Year: 2013).*

Fowler, Austin G., and Craig Gidney. "Low overhead quantum computation using lattice surgery." arXiv preprint arXiv: 1808. 06709v4. (Year: 2019).*

Breuckmann, Nikolas P., et al. "Hyperbolic and semi-hyperbolic surface codes for quantum storage." arXiv preprint arXiv: 1703. 00590. (Year: 2017).*

International Search Report and Written Opinion received for PCT Application Serial No. PCT/EP2021/085401 dated Apr. 19, 2022, 14 pages.

Yoder et al., "Universal Fault-tolerant Quantum Computation With Bacon-Shor Codes", arXiv:1705.01686v1 [quant-oh], May 4, 2017, 15 pages.

Higgott et al., "Subsystem Codes With High Thresholds by Gauge Fixing and Reduced Qubit Overhead", arXiv:2010.09626v2 [quant-ph], Oct. 19, 2020, 30 pages.

Paetznick et al., "Universal Fault-Tolerant Quantum Computation with Only Transversal Gates and Error Correction", Physical Review Letters, vol. 111, No. 9, Sep. 4, 2013, 5 pages.

Response to the communication pursuant to R 161 (1) and R 162 EPC received for European Patent Application Serial No. 21836147.5 dated Nov. 22, 2023, 9 pages.

Mell et al., "The NIST Definition of Cloud Computing," Recommendations of the National Institute of Standards and Technology, NIST Special Publication 800-145, Sep. 2011, 7 pages.

Quan et al., "Fault-tolerant Logical Hadamard Gates Implementation in Reed-Muller Quantum Codes," 20th International Conference on Parallel and Distributed Computing, Applications and Technologies, 2019, 7 pages.

Examination Report No. 1 for Standard Patent Application for Australian Application No. 2021402531 dated Aug. 15, 2023.

Notice of Acceptance received for Australian Patent Application Serial No. 2021402531 dated Jul. 30, 2024, 3 pages.

Reply to the Examination Report received for Australian Patent Application Serial No. 2021402531 dated Jul. 22, 2024, 19 pages.

Reply to the Examination Report received for Australian Patent Application Serial No. 2021402531 dated Apr. 22, 2024, 7 pages.

Examination Report No. 2 received for Australian Patent Application Serial No. 2021402531 dated May 7, 2024, 3 pages.

European Patent Office, European Examination Report for European Application No. 21836147.5 dated Apr. 14, 2025, 9 pages.

Japanese Patent Office, "Decision to Grant a Patent" Japanese Patent Application No. 2023-534932, Jun. 3, 2025, 2 pages.

Notice of First Examination Opinion for Chinese Patent Application No. 202180077462.1, May 19, 2025.

The State Intellectual Property Office of People's Republic of China, The Second Office Action for CN202180077462.1, Sep. 16, 2025, 16 pages.

* cited by examiner

Stabilizers:

*C'*

500

304

*C*

302

X syndrome measurement: Cycle 1

X syndrome measurement: Cycle 2

X syndrome measurement (bulk)

data flag measure

600d

X syndrome measurement: Cycle 3

— 900

902 — APPLYING, BY A SYSTEM OPERATIVELY COUPLED TO A PROCESSOR, A GAUGE FIXING OPERATION TO A SUBSYSTEM CODE OF AN ENCODED QUBIT TO GENERATE A SWITCHED SUBSYSTEM CODE

904 — SHIFTING, BY THE SYSTEM, A LATTICE OF THE SWITCHED SUBSYSTEM CODE TO GENERATE A SHIFTED SWITCHED SUBSYSTEM CODE

LOGICAL HADAMARD GATE OPERATION AND GAUGE FIXING IN SUBSYSTEM CODES

BACKGROUND

The subject disclosure relates to subsystem codes, and more specifically, to logical Hadamard gate operation and gauge fixing in subsystem codes.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Some existing quantum technologies utilize subsystem codes to perform various quantum operations such as, for instance, a Controlled NOT (CNOT) logic gate. A problem with such existing quantum technologies is that they do not perform logical Hadamard gates in such subsystem codes. Another problem with such existing quantum technologies is that they cannot perform gauge fixing in such subsystem codes.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that can facilitate logical Hadamard gate operation and gauge fixing in subsystem codes are described.

According to an embodiment, a system can comprise a processor that executes computer executable components stored in memory. The computer executable components can comprise a gauge fixing component that applies a gauge fixing operation to a subsystem code of an encoded qubit to generate a switched subsystem code. The computer executable components can further comprise a transverse component that applies a transversal Hadamard operation to the switched subsystem code to generate a rotated subsystem code. An advantage of such a system is that it can be implemented to perform a fault tolerant logical Hadamard gate on a quantum code having a property of reducing at least one of: frequency collisions or crosstalk errors associated with a quantum device.

In some embodiments, the computer executable components can further comprise a rotation component that rotates the rotated subsystem code to generate a code that performs a fault tolerant logical Hadamard gate on a quantum code having a property of reducing at least one of: frequency collisions or crosstalk errors associated with a quantum device. An advantage of such a system is that it can be implemented to perform a fault tolerant logical Hadamard gate on a quantum code having a property of reducing at least one of: frequency collisions or crosstalk errors associated with a quantum device.

According to another embodiment, a computer-implemented method can comprise applying, by a system operatively coupled to a processor, a gauge fixing operation to a subsystem code of an encoded qubit to generate a switched subsystem code. The computer-implemented method can further comprise applying, by the system, a transversal Hadamard operation to the switched subsystem code to generate a rotated subsystem code. An advantage of such a computer-implemented method is that it can be implemented to perform a fault tolerant logical Hadamard gate on a quantum code having a property of reducing at least one of: frequency collisions or crosstalk errors associated with a quantum device.

In some embodiments, the computer-implemented method can further comprise rotating, by the system, the rotated subsystem code to generate a code that performs a fault tolerant logical Hadamard gate on a quantum code having a property of reducing at least one of: frequency collisions or crosstalk errors associated with a quantum device. An advantage of such a computer-implemented method is that it can be implemented to perform a fault tolerant logical Hadamard gate on a quantum code having a property of reducing at least one of: frequency collisions or crosstalk errors associated with a quantum device.

According to another embodiment, a computer program product comprising a computer readable storage medium having program instructions embodied therewith, the program instructions executable by a processor to cause the processor to apply a gauge fixing operation to a subsystem code of an encoded qubit to generate a switched subsystem code. The program instructions are further executable by the processor to cause the processor to apply a transversal Hadamard operation to the switched subsystem code to generate a rotated subsystem code. An advantage of such a computer program product is that it can be implemented to perform a fault tolerant logical Hadamard gate on a quantum code having a property of reducing at least one of: frequency collisions or crosstalk errors associated with a quantum device.

In some embodiments, the program instructions are further executable by the processor to cause the processor to rotate the rotated subsystem code to generate a code that performs a fault tolerant logical Hadamard gate on a quantum code having a property of reducing at least one of: frequency collisions or crosstalk errors associated with a quantum device. An advantage of such a computer program product is that it can be implemented to perform a fault tolerant logical Hadamard gate on a quantum code having a property of reducing at least one of: frequency collisions or crosstalk errors associated with a quantum device.

According to an embodiment, a system can comprise a processor that executes computer executable components stored in memory. The computer executable components can comprise a gauge fixing component that applies a gauge fixing operation to a subsystem code of an encoded qubit to generate a switched subsystem code. The computer executable components can further comprise a lattice shift component that shifts a lattice of the switched subsystem code to generate a shifted switched subsystem code. An advantage of such a system is that it can be implemented to perform a fault tolerant logical Hadamard gate on a quantum code having a property of reducing at least one of: frequency collisions or crosstalk errors associated with a quantum device.

In some embodiments, the computer executable components can further comprise a transverse component that applies a transversal Hadamard operation to the shifted switched subsystem code to generate a rotated subsystem code. In these embodiments, the computer executable components can further comprise a rotation component that rotates the rotated subsystem code to generate a code that performs a fault tolerant logical Hadamard gate on a quantum code having a property of reducing at least one of: frequency collisions or crosstalk errors associated with a quantum device. An advantage of such a system is that it can be implemented to perform a fault tolerant logical Hadamard gate on a quantum code having a property of reducing at least one of: frequency collisions or crosstalk errors associated with a quantum device.

According to another embodiment, a computer-implemented method can comprise applying, by a system operatively coupled to a processor, a gauge fixing operation to a subsystem code of an encoded qubit to generate a switched subsystem code. The computer-implemented method can further comprise shifting, by the system, a lattice of the switched subsystem code to generate a shifted switched subsystem code. An advantage of such a computer-implemented method is that it can be implemented to perform a fault tolerant logical Hadamard gate on a quantum code having a property of reducing at least one of: frequency collisions or crosstalk errors associated with a quantum device.

In some embodiments, the computer-implemented method can further comprise applying, by the system, a transversal Hadamard operation to the shifted switched subsystem code to generate a rotated subsystem code. In these embodiments, the computer-implemented method can further comprise rotating, by the system, the rotated subsystem code to generate a code that performs a fault tolerant logical Hadamard gate on a quantum code having a property of reducing at least one of: frequency collisions or crosstalk errors associated with a quantum device. An advantage of such a computer-implemented method is that it can be implemented to perform a fault tolerant logical Hadamard gate on a quantum code having a property of reducing at least one of: frequency collisions or crosstalk errors associated with a quantum device.

DETAILED DESCRIPTION

Figure 1:
FIGS. 1 and 2 illustrate block diagrams of example, non-limiting systems that can each facilitate logical Hadamard gate operation and gauge fixing in subsystem codes in accordance with one or more embodiments described herein.
Figure 1:
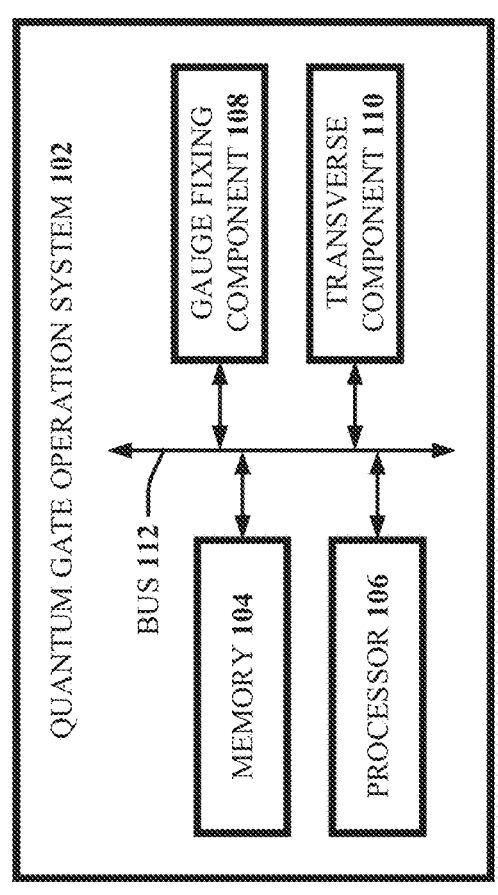

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems described above with existing quantum technologies, the present disclosure can be implemented to produce a solution to these problems in the form of systems, computer-implemented methods, and/or computer program products that can facilitate logical Hadamard gate operation and gauge fixing in subsystem codes by: applying a gauge fixing operation to a subsystem code of an encoded qubit to generate a switched subsystem code; and/or applying a transversal Hadamard operation to the switched subsystem code to generate a rotated subsystem code. An advantage of such systems, computer-implemented methods, and/or computer program products is that they can be implemented to perform a fault tolerant logical Hadamard gate on a quantum code having a property of reducing at least one of: frequency collisions or crosstalk errors associated with a quantum device.

In some embodiments, the present disclosure can be implemented to produce a solution to the problems described above in the form of systems, computer-implemented methods, and/or computer program products that can further facilitate logical Hadamard gate operation and gauge fixing in subsystem codes by: rotating the rotated subsystem code to generate a code that performs a fault tolerant logical Hadamard gate on a quantum code having a property of reducing at least one of: frequency collisions or crosstalk errors associated with a quantum device. An advantage of such systems, computer-implemented methods, and/or computer program products is that they can be implemented to perform a fault tolerant logical Hadamard gate on a quantum code having a property of reducing at least one of: frequency collisions or crosstalk errors associated with a quantum device.

As referenced herein, an "entity" can comprise a human, a client, a user, a computing device, a software application, an agent, a machine learning (ML) model, an artificial intelligence (AI), and/or another entity. It will be understood that when an element is referred to herein as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling.

Figure 2:
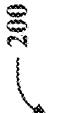
Figure 2:
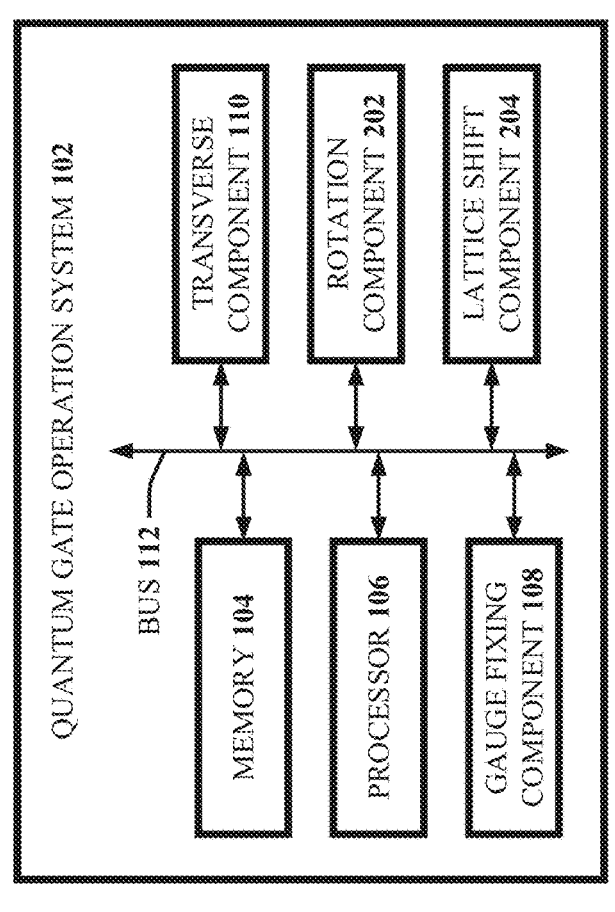

FIGS. 1 and 2 illustrate block diagrams of example, non-limiting systems 100 and 200, respectively, that can each facilitate logical Hadamard gate operation and gauge fixing in subsystem codes in accordance with one or more embodiments described herein. System 100 and 200 can each comprise a quantum gate operation system 102. Quantum gate operation system 102 of system 100 depicted in FIG. 1 can comprise a memory 104, a processor 106, a gauge fixing component 108, a transverse component 110, and/or a bus 112. Quantum gate operation system 102 of system 200 depicted in FIG. 2 can further comprise a rotation component 202 and/or a lattice shift component 204.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, system 200, and/or quantum gate operation system 102 can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1, FIG. 2, and/or other figures disclosed herein.

Memory 104 can store one or more computer and/or machine readable, writable, and/or executable components and/or instructions that, when executed by processor 106 (e.g., a classical processor, a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum gate operation system 102, gauge fixing component 108, transverse component 110, rotation component 202, lattice shift component 204, and/or another component associated with quantum gate operation system 102 as described herein with or without reference to the various figures of the subject disclosure.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 1016 and FIG. 10. Such examples of memory 104 can be employed to implement any embodiments of the subject disclosure.

Processor 106 can comprise one or more types of processors and/or electronic circuitry (e.g., a classical processor, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, micro-processor, dual microprocessors, microcontroller, System on a Chip (SOC), array processor, vector processor, quantum processor, and/or another type of processor. Further examples of processor 106 are described below with reference to processing unit 1014 and FIG. 10. Such examples of processor 106 can be employed to implement any embodiments of the subject disclosure.

Quantum gate operation system 102, memory 104, processor 106, gauge fixing component 108, transverse component 110, rotation component 202, lattice shift component 204, and/or another component of quantum gate operation system 102 as described herein can be communicatively, electrically, operatively, and/or optically coupled to one another via bus 112 to perform functions of system 100, system 200, quantum gate operation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 1018 and FIG. 10. Such examples of bus 112 can be employed to implement any embodiments of the subject disclosure.

Quantum gate operation system 102 can comprise any type of component, machine, device, facility, apparatus, and/or instrument that comprises a processor and/or can be capable of effective and/or operative communication with a wired and/or wireless network. All such embodiments are envisioned. For example, quantum gate operation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Quantum gate operation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, quantum gate operation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, quantum gate operation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet), a local area network (LAN), and/or another network. Quantum gate operation system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, quantum gate operation system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between quantum gate operation system 102 and external systems, sources, and/or devices (e.g., computing devices, communication devices, and/or another type of external system, source, and/or device).

Quantum gate operation system 102 can comprise one or more computer and/or machine readable, writable, and/or executable components and/or instructions that, when executed by processor 106 (e.g., a classical processor, a quantum processor, and/or another type of processor), can facilitate performance of operations defined by such component(s) and/or instruction(s). Further, in numerous embodiments, any component associated with quantum gate operation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, gauge fixing component 108, transverse component 110, rotation component 202, lattice shift component 204, and/or any other component associated with quantum gate operation system 102 as disclosed herein (e.g., communicatively, electronically, operatively, and/or optically coupled with and/or employed by quantum gate operation system 102), can comprise such computer and/or machine readable, writable, and/or executable component(s) and/or instruction(s). Consequently, according to numerous embodiments, quantum gate operation system 102 and/or any components associated therewith as disclosed herein, can employ processor 106 to execute such computer and/or machine readable, writable, and/or executable component(s) and/or instruction(s) to facilitate performance of one or more operations described herein with reference to quantum gate operation system 102 and/or any such components associated therewith.

Quantum gate operation system 102 can facilitate (e.g., via processor 106) performance of operations executed by and/or associated with gauge fixing component 108, transverse component 110, rotation component 202, lattice shift component 204, and/or another component associated with quantum gate operation system 102 as disclosed herein. For example, as described in detail below, quantum gate operation system 102 can facilitate (e.g., via processor 106): applying a gauge fixing operation to a subsystem code of an encoded qubit to generate a switched subsystem code; and/or applying a transversal Hadamard operation to the switched subsystem code to generate a rotated subsystem code. In this example, as described in detail below, quantum gate operation system 102 can further facilitate (e.g., via processor 106): rotating the rotated subsystem code to generate a code that performs a fault tolerant logical Hadamard gate on a quantum code having a property of reducing at least one of frequency collisions or crosstalk errors associated with a quantum device; applying the gauge fixing operation to the subsystem code to interchange two-body gauge operators and four-body gauge operators in a subset of the subsystem code; applying the transversal Hadamard operation to the switched subsystem code to apply Hadamard gates on data qubits and to interchange X type gauge operators and Z type gauge operators, X type stabilizers and Z type stabilizers, and X type logical operators and Z type logical operators; and/or performing two pairwise swap gate operations between qubits that are symmetric to one another with respect to a vertical axis and a diagonal axis in the rotated subsystem code.

In another example, as described in detail below, quantum gate operation system 102 can facilitate (e.g., via processor 106): applying a gauge fixing operation to a subsystem code of an encoded qubit to generate a switched subsystem code; and/or shifting a lattice of the switched subsystem code to generate a shifted switched subsystem code. In this example, as described in detail below, quantum gate operation system 102 can further facilitate (e.g., via processor 106): applying a transversal Hadamard operation to the shifted switched subsystem code to generate a rotated subsystem code; rotating the rotated subsystem code to generate a code that performs a fault tolerant logical Hadamard gate on a quantum code having a property of reducing at least one of frequency collisions or crosstalk errors associated with a quantum device; applying the gauge fixing operation to the subsystem code to interchange two-body gauge operators and four-body gauge operators in a subset of the subsystem code; applying the transversal Hadamard operation to the shifted switched subsystem code to apply Hadamard gates on data qubits and to interchange X type gauge operators and Z type gauge operators, X type stabilizers and Z type stabilizers, and X type logical operators and Z type logical operators; and/or performing two pairwise swap gate operations between qubits that are symmetric to one another with respect to a vertical axis and a diagonal axis in the rotated subsystem code.

Gauge fixing component 108 can apply a gauge fixing operation to a subsystem code of an encoded qubit to generate a switched subsystem code. For instance, with reference to the example, non-limiting diagram 300 illustrated in FIG. 3, gauge fixing component 108 can apply a gauge fixing operation to a subsystem code 302 (denoted as C in FIG. 3) of an encoded qubit to generate a switched subsystem code 304 (denoted as C' in FIG. 3).

Figure 3:
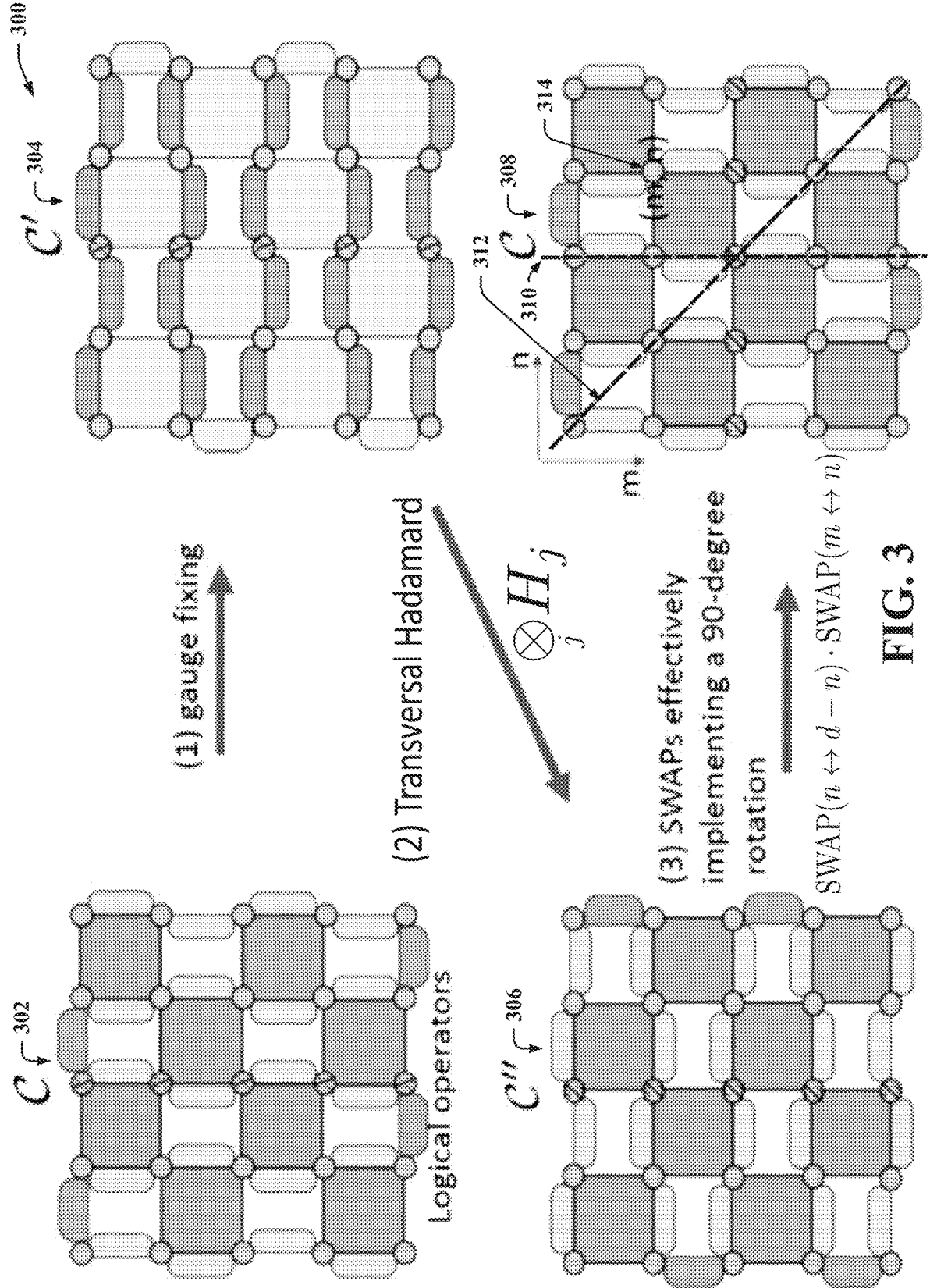
FIGS. 3, 4, 5, 6A, 6B, 6C, 6D, 6E, 7A, and 7B illustrate example, non-limiting diagrams that can facilitate logical Hadamard gate operation and gauge fixing in subsystem codes in accordance with one or more embodiments described herein.

FIG. 3 illustrates an example, non-limiting diagram 300 that can facilitate logical Hadamard gate operation and gauge fixing in subsystem codes in accordance with one or more embodiments described herein. Repetitive description of like elements and/or processes employed in respective embodiments is omitted for sake of brevity.

As described above and as illustrated in the example, non-limiting diagram 300 depicted in FIG. 3, gauge fixing component 108 can apply a gauge fixing operation to subsystem code 302 of an encoded qubit to generate switched subsystem code 304. For example, as described below with reference to FIGS. 4-6E, gauge fixing component 108 can apply a gauge fixing operation to subsystem code 302 to interchange two-body gauge operators and four-body gauge operators in a subset of subsystem code 302. For instance, gauge fixing component 108 can apply a gauge fixing operation to subsystem code 302 to interchange two-body gauge operators and four-body gauge operators in the bulk of subsystem code 302 for both the X types and Z types, which effectively switches subsystem code 302 to switched subsystem code 304 as illustrated in FIG. 3.

In the example, non-limiting diagram 300 depicted in FIG. 3, transverse component 110 can apply a transversal Hadamard operation to switched subsystem code 304 to generate a rotated subsystem code 306 (denoted as C" in FIG. 3). For example, transverse component 110 can apply a transversal Hadamard operation to switched subsystem code 304 to apply Hadamard gates on data qubits and to interchange: X type gauge operators and Z type gauge operators; X type stabilizers and Z type stabilizers; and X type logical operators and Z type logical operators. That is, for instance, transverse component 110 can apply a transversal Hadamard operation to apply Hadamard gates on all the data qubits, which interchanges the X and Z type gauge operators and stabilizers and effectively switches switched subsystem code 304 to rotated subsystem code 306.

In the example, non-limiting diagram 300 depicted in FIG. 3, rotation component 202 can rotate rotated subsystem code 306 to generate a code 308 that performs a fault tolerant logical Hadamard gate on a quantum code having a property of reducing at least one of: frequency collisions or crosstalk errors associated with a quantum device. In this example embodiment, to rotate rotated subsystem code 306 to generate code 308, rotation component 202 can perform two pairwise swap gate operations between qubits that are symmetric to one another with respect to a vertical axis 310 and a diagonal axis 312 in rotated subsystem code 306. For example, as annotated in FIG. 3, to rotate rotated subsystem code 306 to generate code 308, rotation component 202 can employ Equation (1) defined below to perform two pairwise swap gate operations between qubits that are symmetric to one another with respect to vertical axis 310 and diagonal axis 312, where such swap gate operations effectively implement a 90 degree (90°) rotation.

$$\text{SWAP}(n \leftrightarrow d-n) \cdot \text{SWAP}(m \leftrightarrow n) \qquad \text{Equation (1):}$$

where m denotes the row of a data qubit location in the subsystem code, n denotes the column of a data qubit location in the subsystem code, and d denotes the subsystem code distance of the subsystem code, which equals the total number of rows and columns of data qubits in the subsystem code. In accordance with multiple embodiments of the subject disclosure, such data qubits are represented as dots 314 in the various subsystem codes illustrated in the figures described herein. In the example, non-limiting diagram 300 depicted in FIG. 3, by employing Equation (1) defined above to perform the two pairwise swap gate operations between such qubits as described above, rotation component 202 can perform permutation of the qubits, which effectively rotates the code by 90° and switches it back to subsystem code 302.

In some embodiments, for example, as described below with reference to FIGS. 7A and 7B, gauge fixing component 108 can apply a gauge fixing operation to a subsystem code of an encoded qubit to generate a switched subsystem code and lattice shift component 204 can shift a lattice of the switched subsystem code to generate a shifted switched subsystem code. In these embodiments, transverse component 110 can apply a transversal Hadamard operation to the shifted switched subsystem code to generate a rotated subsystem code and rotation component 202 can rotate the rotated subsystem code to generate a code that performs a fault tolerant logical Hadamard gate on a quantum code having a property of reducing at least one of frequency collisions or crosstalk errors associated with a quantum device. In these embodiments, gauge fixing component 108 can apply the gauge fixing operation to the subsystem code to interchange two-body gauge operators and four-body gauge operators in a subset of the subsystem code. In these embodiments, transverse component 110 can apply the transversal Hadamard operation to the shifted switched subsystem code to apply Hadamard gates on data qubits and to interchange: X type gauge operators and Z type gauge operators; X type stabilizers and Z type stabilizers; and X type logical operators and Z type logical operators. In these embodiments, rotation component 202 can perform two pairwise swap gate operations between qubits that are symmetric to one another with respect to a vertical axis and a diagonal axis in the rotated subsystem code.

Figure 4:
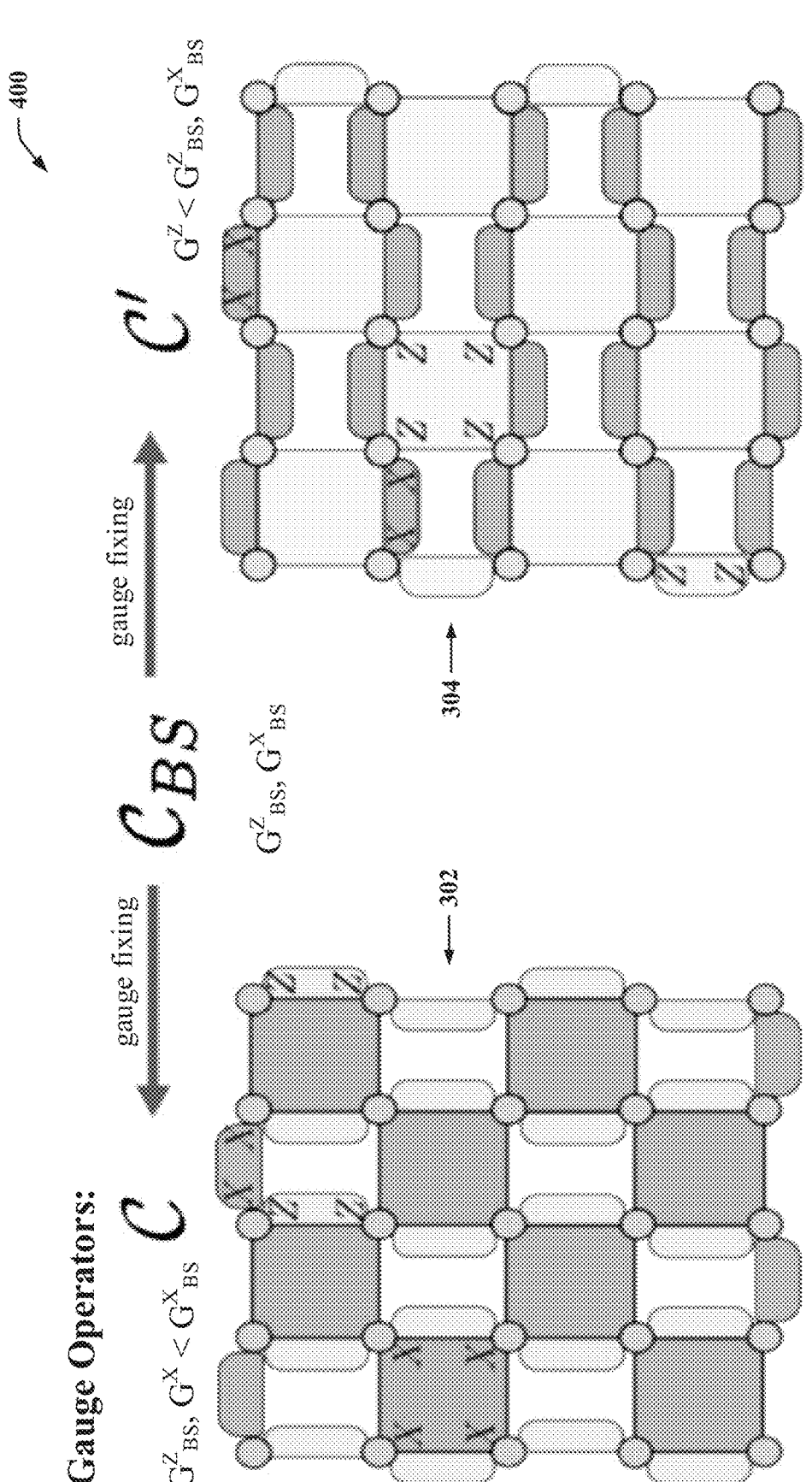

FIG. 4 illustrates an example, non-limiting diagram 400 that can facilitate logical Hadamard gate operation and gauge fixing in subsystem codes in accordance with one or more embodiments described herein. Repetitive description of like elements and/or processes employed in respective embodiments is omitted for sake of brevity.

Diagram 400 illustrates gauge operators after gauge fixing to a heavy-hex code. A gauge group G' is a gauge fixing of G if $S(G) \leq S(G') \leq G'$ and $k(G)=k(G')$, where $S(G)$ is the stabilizer of G and $k(G)$ is the number of encoded qubits. In the example diagram 400 illustrated in FIG. 4, subsystem code 302 and switched subsystem code 304 are gauge fixings of the Bacon-Shor code denoted as "$C_{BS}$" in FIG. 4.

In the example diagram 400 illustrated in FIG. 4, the bulk of subsystem code 302 comprises 4-body X gauge operators (depicted in a dark gray square of subsystem code 302) and vertical 2-body Z gauge operators (depicted in a vertical light gray semi-circle of subsystem code 302). In various embodiments of the subject disclosure, such bulk of subsystem code 302 can constitute a subset of subsystem code 302. On the boundary of subsystem code 302 illustrated in the example diagram 400 depicted in FIG. 4, there are horizontal 2-body X gauge operators (depicted in a horizontal dark gray semi-circle of subsystem code 302). In various embodiments of the subject disclosure, the boundary of subsystem code 302 can constitute a subset of subsystem code 302.

In the example diagram 400 illustrated in FIG. 4, the bulk of switched subsystem code 304 comprises 4-body Z gauge operators (depicted in a light gray square of switched subsystem code 304) and horizontal 2-body X gauge operators (depicted in a horizontal dark gray semi-circle of switched subsystem code 304). In various embodiments of the subject disclosure, such bulk of switched subsystem code 304 can constitute a subset of switched subsystem code 304. On the boundary of switched subsystem code 304 illustrated in the example diagram 400 depicted in FIG. 4, there are vertical 2-body Z gauge operators (depicted in a vertical light gray semi-circle of switched subsystem code 304). In various embodiments of the subject disclosure, the boundary of switched subsystem code 304 can constitute a subset of switched subsystem code 304.

In the example diagram 400 illustrated in FIG. 4, prior to applying a gauge fixing operation, gauge fixing component 108 can split the 4-body X gauge operators in the bulk into a pair of two horizontal 2-body gauge operators. In the example diagram 400 illustrated in FIG. 4, prior to applying a gauge fixing operation, gauge fixing component 108 can merge a pair of two vertical 2-body Z gauge operators in the bulk into a 4-body gauge operator.

Figure 5:
Figure 5:
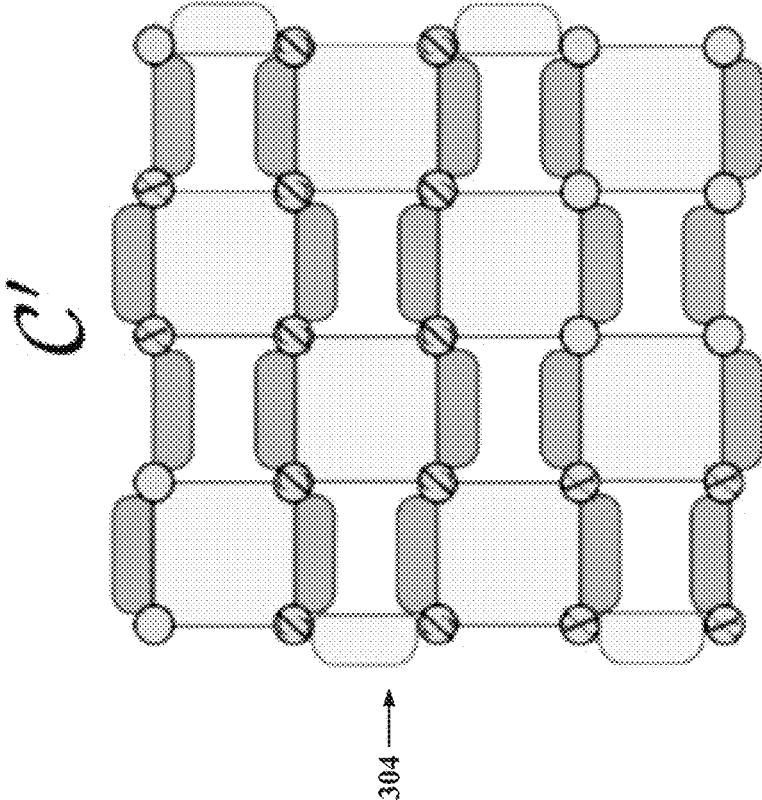
Figure 5:
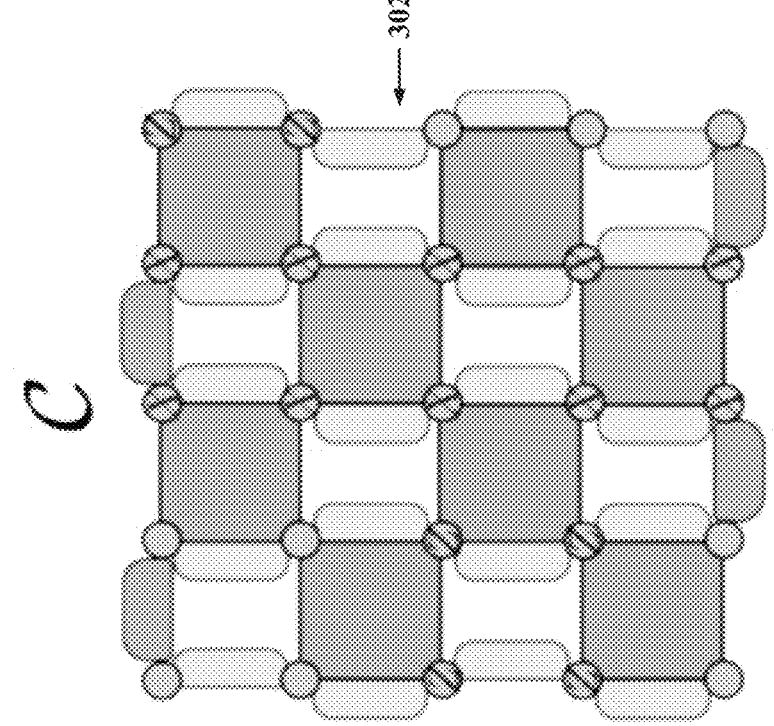

FIG. 5 illustrates an example, non-limiting diagram 500 that can facilitate logical Hadamard gate operation and gauge fixing in subsystem codes in accordance with one or more embodiments described herein. Repetitive description of like elements and/or processes employed in respective embodiments is omitted for sake of brevity.

Diagram 500 illustrates stabilizers of the above described heavy-hexagon gauge fixings. For instance, in the example diagram 500 depicted in FIG. 5, subsystem code 302 illustrates stabilizers prior to application of a gauge fixing operation by gauge fixing component 108 and switched subsystem code 304 illustrates stabilizers after application of a gauge fixing operation by gauge fixing component 108.

In the bulk of subsystem code 302 depicted in the example diagram 500 illustrated in FIG. 5, the 4-body Z stabilizers is a product of a pair of vertical 2-body Z gauge operators (denoted by light gray vertical semi-circles in subsystem code 302) and the X stabilizer is a 2-column vertical strip of Pauli X's. On the boundary of subsystem code 302 depicted in the example diagram 500 illustrated in FIG. 5, there are vertical 2-body Z gauge operators (denoted by light gray vertical semi-circles in subsystem code 302).

In the bulk of switched subsystem code 304 depicted in the example diagram 500 illustrated in FIG. 5, the 4-body X stabilizers is a product of a pair of horizontal 2-body X-gauge operators (denoted by dark gray horizontal semi-circles in switched subsystem code 304) and the Z stabilizer is a 2-row horizontal strip of Pauli Z's. On the boundary of switched subsystem code 304 depicted in the example diagram 500 illustrated in FIG. 5, there are horizontal 2-body X gauge operators (denoted by dark gray horizontal semi-circles in switched subsystem code 304).

In accordance with one or more embodiments of the subject disclosure described herein, to facilitate application of a gauge fixing operation to a subsystem code (e.g., subsystem code 302) of an encoded qubit to generate a switched subsystem code (e.g., switched subsystem code 304), gauge fixing component 108 can employ the gauge fixing protocol defined below.

Gauge Fixing Protocol (1) For the bulk, gauge fixing component 108 measures all the 2-body X gauge operators, and can further infer the 4-body X stabilizer eigenvalues (e.g., recorded as M).

If M=+1, no correction is needed by gauge fixing component 108.

If M=−1, gauge fixing component 108 can apply Pauli Z to correct the stabilizer.

In this way, the original 4-body X gauge operators in subsystem code 302 are fixed into stabilizers in switched subsystem code 304.

In the absence of measurement noise, gauge fixing component 108 can perform the above operation in one (1) cycle.

In the presence of measurement noise, gauge fixing component 108 can perform d cycles of measurements to decode and apply Z corrections.

(2) For the boundary, in performing the bulk measurement, gauge fixing component 108 can simultaneously measure all the 2-body X boundary stabilizers (e.g., recorded as M) and further apply correction (e.g., in the same manner as done with the bulk as described above).

In this way, the original 2-body X gauge operators in subsystem code 302 are fixed into boundary stabilizers in switched subsystem code 304.

(3) In the presence of measurement errors, gauge fixing component 108 also applies d cycles of measurements of the 4-body Z gauge operators (e.g., as opposed to one (1) cycle without measurement errors).

Each cycle of Z measurement can be applied by gauge fixing component 108 after each cycle of X measurements.

Gauge fixing component 108 can hence apply X corrections after decoding the d cycles of syndrome history.

Figure 6A:
Figure 6B:

FIGS. 6A and 6B illustrate example, non-limiting diagrams 600a and 600b, respectively, that can each facilitate logical Hadamard gate operation and gauge fixing in subsystem codes in accordance with one or more embodiments described herein. Repetitive description of like elements and/or processes employed in respective embodiments is omitted for sake of brevity.

The example diagrams 600a and 600b depicted in FIGS. 6A and 6B, respectively, illustrate Controlled NOT (CNOT) gate scheduling that can be used by gauge fixing component 108 to measure the X gauge operators as described above in two (2) successive cycles (e.g., X syndrome measurement), where diagram 600a depicts cycle 1 and diagram 600b depicts cycle 2. To facilitate such CNOT gate scheduling that can be used by gauge fixing component 108 to measure the X gauge operators as described above in two (2) successive cycles (e.g., X syndrome measurement), gauge fixing component 108 can employ the corresponding circuits described below and illustrated in FIG. 6C.

Figure 6C:
Figure 6C:
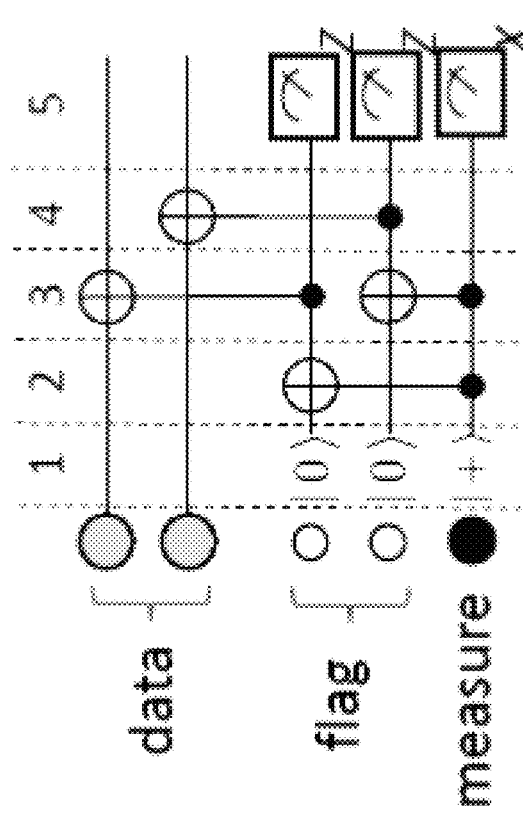
Figure 6C:
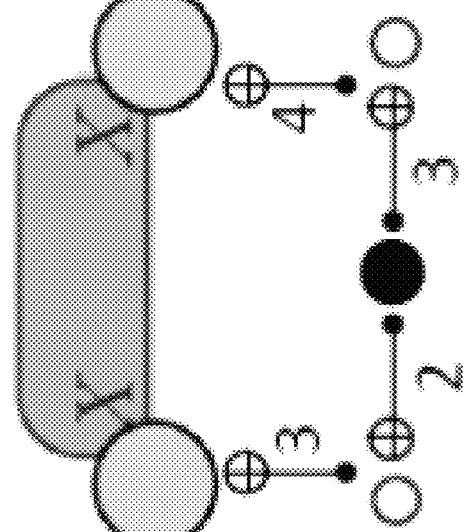

FIG. 6C illustrates an example, non-limiting diagram 600c that can facilitate logical Hadamard gate operation and gauge fixing in subsystem codes in accordance with one or more embodiments described herein. Repetitive description of like elements and/or processes employed in respective embodiments is omitted for sake of brevity.

To facilitate the above described CNOT gate scheduling illustrated in diagrams 600a and 600b that can be used by gauge fixing component 108 to measure the X gauge operators as described above in two (2) successive cycles (e.g., X syndrome measurement (e.g., bulk)), gauge fixing component 108 can employ the corresponding circuits depicted in diagram 600c shown in FIG. 6C. The example diagram 600c illustrated in FIG. 6C can comprise a measurement circuit of the 2-body X gauge operators in the bulk of a subsystem code (e.g., in the bulk of subsystem code 302 and/or switched subsystem code 304). In some embodiments, gauge fixing component 108 can measure the boundary 2-body X gauge operators with a standard circuit comprising two (2) CNOT gates.

Figure 6D:

FIG. 6D illustrates an example, non-limiting diagram 600d that can facilitate logical Hadamard gate operation and gauge fixing in subsystem codes in accordance with one or more embodiments described herein. Repetitive description of like elements and/or processes employed in respective embodiments is omitted for sake of brevity.

The example diagram 600c depicted in FIG. 6C illustrates CNOT gate scheduling that can be used by gauge fixing component 108 to measure the Z gauge operators in a third cycle (e.g., Z syndrome measurement), where diagram 600c depicts cycle 3. To facilitate such CNOT gate scheduling that can be used by gauge fixing component 108 to measure the Z gauge operators in cycle 3 (e.g., Z syndrome measurement), gauge fixing component 108 can employ the corresponding circuit described below and illustrated in FIG. 6E.

Figure 6E:
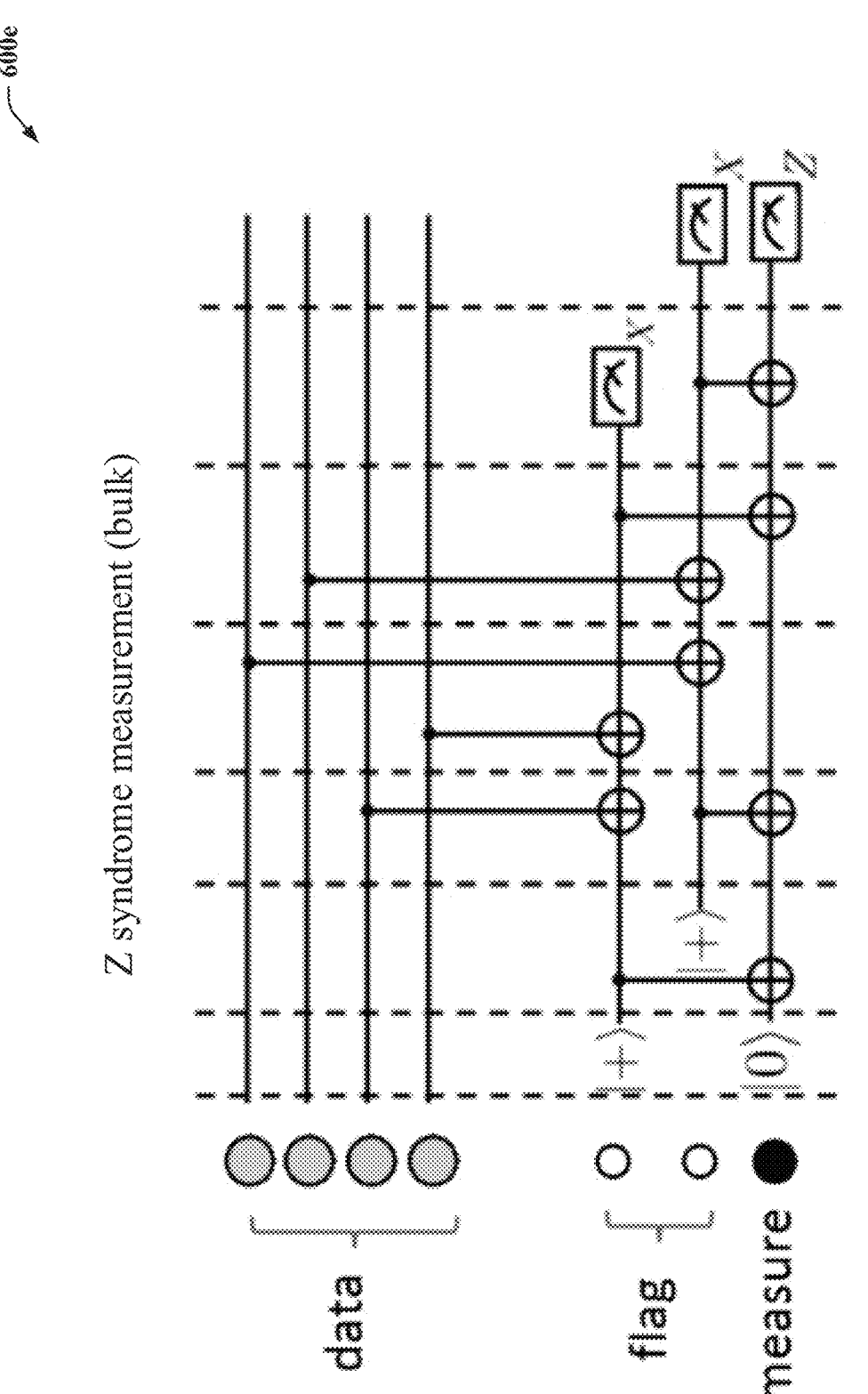

FIG. 6E illustrates an example, non-limiting diagram 600e that can facilitate logical Hadamard gate operation and gauge fixing in subsystem codes in accordance with one or more embodiments described herein. Repetitive description of like elements and/or processes employed in respective embodiments is omitted for sake of brevity.

To facilitate the above described CNOT gate scheduling illustrated in diagram 600d that can be used by gauge fixing component 108 to measure the Z gauge operators in cycle 3 (e.g., Z syndrome measurement (e.g., bulk)), gauge fixing component 108 can employ the corresponding circuit depicted in diagram 600e shown in FIG. 6E. The example diagram 600e illustrated in FIG. 6E can comprise a measurement circuit of the 2-body Z gauge operators in the bulk of a subsystem code (e.g., in the bulk of subsystem code 302 and/or switched subsystem code 304).

Figures 7A, 7B:
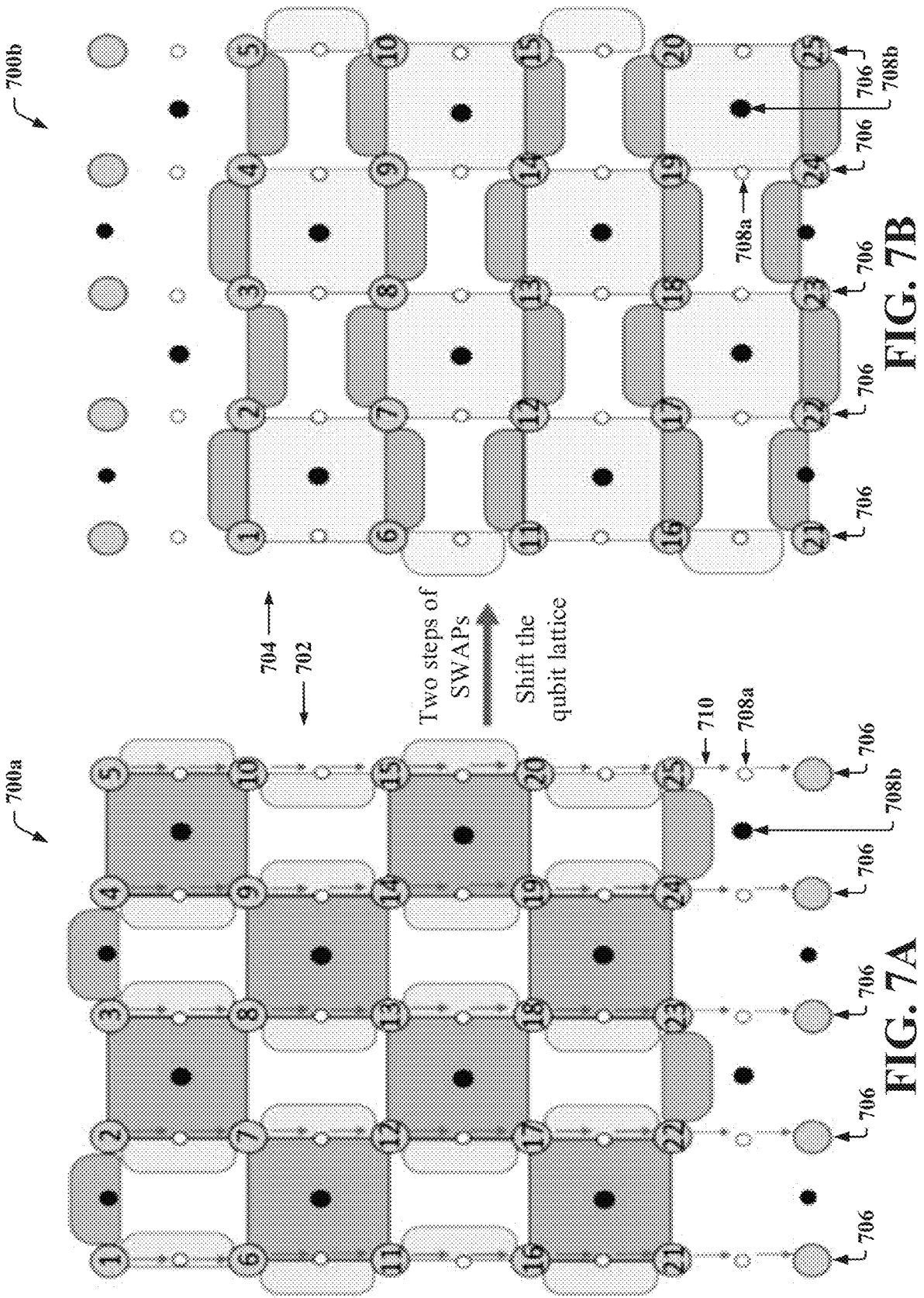

FIGS. 7A and 7B illustrate example, non-limiting diagrams 700a and 700b, respectively, that can each facilitate logical Hadamard gate operation and gauge fixing in subsystem codes in accordance with one or more embodiments described herein. Repetitive description of like elements and/or processes employed in respective embodiments is omitted for sake of brevity.

In some embodiments, gauge fixing component 108 can apply a gauge fixing operation on a heavy-hexagon lattice. In these embodiments, to implement a gauge fixing operation on the heavy-hexagon lattice, the qubit lattice can be shifted by one lattice constant after application of the gauge fixing operation. In these embodiments, to apply a gauge fixing operation on a heavy-hexagon lattice, gauge fixing component 108 can apply a gauge fixing operation on a subsystem code of an encoded qubit to generate a switched subsystem code and lattice shift component 204 can shift a lattice of the switched subsystem code to generate a shifted switched subsystem code. For example, as illustrated in the example diagrams 700a and 700b depicted in FIGS. 7A and 7B, respectively, gauge fixing component 108 can apply a gauge fixing operation to a subsystem code 702 to generate a switched subsystem code as described above with reference to the example embodiments illustrated in FIGS. 1-6E and lattice shift component 204 can shift a qubit lattice of the switched subsystem code to generate a shifted switched subsystem code 704. As illustrated in the example diagrams 700a and 700b depicted in FIGS. 7A and 7B, respectively, such a qubit lattice can comprise a plurality (e.g., twenty-five (25)) of qubits (represented by gray circles in diagrams 700a and 700b).

To shift such a qubit lattice, lattice shift component 204 can implement the following SWAP protocol to shift the qubit lattice by a lattice constant of, for instance, one (1). For example, as illustrated in the example diagrams 700a and 700b depicted in FIGS. 7A and 7B, respectively, to shift the qubit lattice by a lattice constant of one (1), lattice shift component 204 can add a row of additional data qubits 706 at the bottom of the qubit lattice depicted in diagram 700a and can further add corresponding additional ancilla qubits 708a, 708b (represented by white and black circles, respectively, in diagrams 700a and 700b) to the qubit lattice. For clarity, not all additional ancilla qubits 708a, 708b are annotated in diagrams 700a and 700b. In an example, to shift the qubit lattice by a lattice constant of one (1), lattice shift component 204 can apply a first step of SWAPs, represented by arrows 710 in diagram 700a, to all data qubits in the qubit lattice to move the quantum information of such data qubits to additional ancilla qubits 708a, where such quantum information is represented by numbers 1-25 in diagrams 700a and 700b. In this example, to complete such a qubit lattice shift operation, lattice shift component 204 can apply a second step of SWAPs to move the quantum information to additional data qubits 706 located one row below.

In the above example, by implementing the above described gauge fixing operation and SWAP protocol, gauge fixing component 108 and lattice shift component 204 can thereby generate shifted switched subsystem code 704 illustrated in diagram 700b depicted in FIG. 7B, where shifted switched subsystem code 704 comprises a shifted qubit lattice and a switched subsystem code that can be generated by performing the two steps of SWAPs and gauge fixing operation described above. It should be appreciated that gauge fixing component 108 and lattice shift component 204 can respectively perform the gauge fixing operation and SWAP protocol described above to satisfy one or more hardware criteria of a quantum device that can be used to execute a subsystem code (e.g., a heavy-hexagon code).

In embodiments where gauge fixing component 108 and lattice shift component 204 respectively perform the gauge fixing operation and SWAP protocol described above, gauge fixing component 108 can apply (e.g., as described above with reference to FIGS. 1-6E) the above described gauge fixing operation to subsystem code 702 to interchange two-body gauge operators and four-body gauge operators in a subset (e.g., the bulk) of subsystem code 702. In these embodiments, transverse component 110 can apply (e.g., as described above with reference to FIGS. 1, 2, and 3) a transversal Hadamard operation to shifted switched subsystem code 704 to generate a rotated subsystem code (not illustrated in FIG. 7A or 7B). In these embodiments, transverse component 110 can apply (e.g., as described above with reference to FIGS. 1, 2, and 3) the transversal Hadamard operation to shifted switched subsystem code 704 to apply Hadamard gates on data qubits (e.g., data qubits in the qubit lattice) and to interchange: X type gauge operators and Z type gauge operators; X type stabilizers and Z type stabilizers; and X type logical operators and Z type logical operators. In these embodiments, rotation component 202 can perform (e.g., as described above with reference to FIGS. 1, 2, and 3) two pairwise swap gate operations between qubits that are symmetric to one another with respect to a vertical axis and a diagonal axis in the rotated subsystem code. In these embodiments, rotation component 202 can rotate (e.g., as described above with reference to FIGS. 1, 2, and 3) the rotated subsystem code to generate a code (not illustrated in FIG. 7A or 7B) that performs a fault tolerant logical Hadamard gate on a quantum code having a property of reducing at least one of frequency collisions or crosstalk errors associated with a quantum device.

Figure 8:
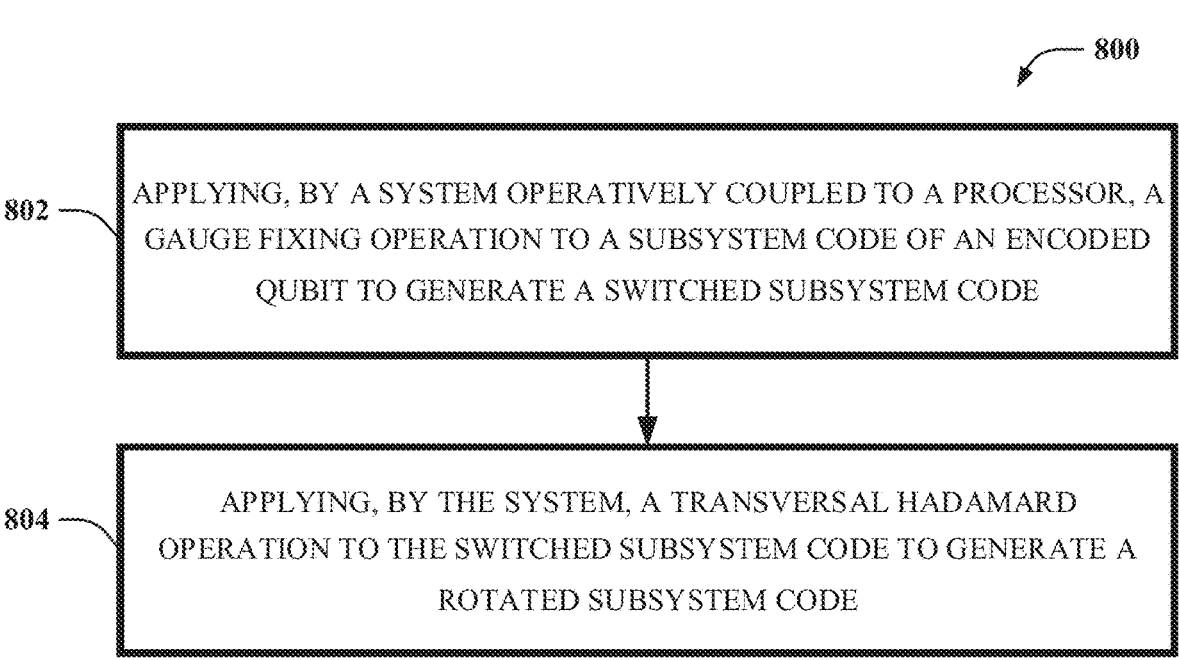
FIGS. 8 and 9 illustrate flow diagrams of example, non-limiting computer-implemented methods that can facilitate logical Hadamard gate operation and gauge fixing in subsystem codes in accordance with one or more embodiments described herein.

FIG. 8 illustrates a flow diagram of an example, non-limiting computer-implemented method 800 that can facilitate logical Hadamard gate operation and gauge fixing in subsystem codes in accordance with one or more embodiments described herein. Repetitive description of like elements and/or processes employed in respective embodiments is omitted for sake of brevity.

At 802, computer-implemented method 800 can comprise applying, by a system (e.g., via quantum gate operation system 102 and/or gauge fixing component 108) operatively coupled to a processor (e.g., processor 106), a gauge fixing operation to a subsystem code (e.g., subsystem code 302) of an encoded qubit to generate a switched subsystem code (e.g., switched subsystem code 304). For example, as described above with reference to FIGS. 1-6E, gauge fixing component 108 can apply a gauge fixing operation to subsystem code 302 to generate switched subsystem code 304.

At 804, computer-implemented method 800 can comprise applying, by the system (e.g., via quantum gate operation system 102 and/or transverse component 110), a transversal Hadamard operation to the switched subsystem code to generate a rotated subsystem code (e.g., rotated subsystem code 306). For example, as described above with reference to FIGS. 1, 2, and 3, transverse component 110 can apply a transversal Hadamard operation to switched subsystem code 304 to generate rotated subsystem code 306.

In some embodiments, although not depicted in the example embodiment illustrated in FIG. 8, computer-implemented method 800 can further comprise rotating, by the system (e.g., via quantum gate operation system 102 and/or rotation component 202), the rotated subsystem code (e.g., rotated subsystem code 306) to generate a code (e.g., code 308) that performs a fault tolerant logical Hadamard gate on a quantum code having a property of reducing at least one of: frequency collisions or crosstalk errors associated with a quantum device. For example, as described above with reference to FIGS. 1, 2, and 3, rotation component 202 can rotate rotated subsystem code 306 to generate code 308 that performs a fault tolerant logical Hadamard gate on a quantum code having a property of reducing at least one of: frequency collisions or crosstalk errors associated with a quantum device.

Figure 9:
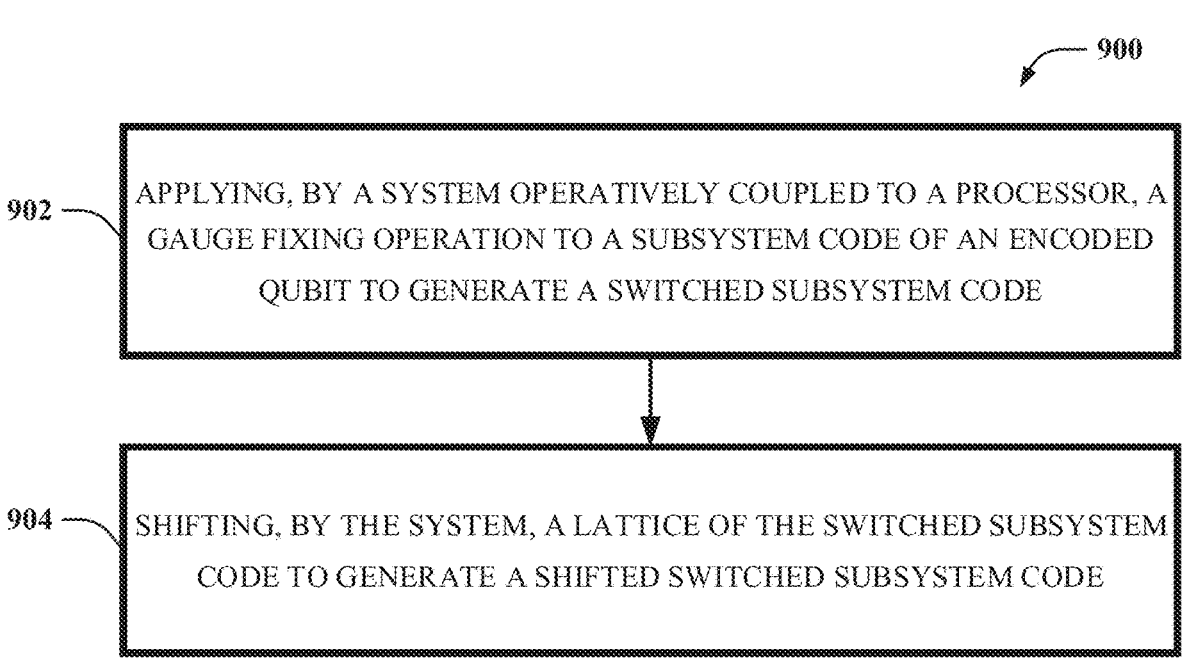

FIG. 9 illustrates a flow diagram of an example, non-limiting computer-implemented method 900 that can facilitate logical Hadamard gate operation and gauge fixing in subsystem codes in accordance with one or more embodiments described herein. Repetitive description of like elements and/or processes employed in respective embodiments is omitted for sake of brevity.

At 902, computer-implemented method 900 can comprise applying, by a system (e.g., via quantum gate operation system 102 and/or gauge fixing component 108) operatively coupled to a processor (e.g., processor 106), a gauge fixing operation to a subsystem code (e.g., subsystem code 702) of an encoded qubit to generate a switched subsystem code (not illustrated in the figures). For example, as described above with reference to FIGS. 7A and 7B, gauge fixing component 108 can apply a gauge fixing operation to subsystem code 702 to generate a switched subsystem code (not illustrated in the figures).

At 904, computer-implemented method 900 can comprise shifting, by the system (e.g., via quantum gate operation system 102 and/or lattice shift component 204), a lattice (e.g., a qubit lattice) of the switched subsystem code to generate a shifted switched subsystem code (e.g., shifted switched subsystem code 704). For example, as described above with reference to FIGS. 7A and 7B, lattice shift component 204 can employ the above described SWAP protocol to shift a qubit lattice of the switched subsystem code generated by gauge fixing component 108 to generate shifted switched subsystem code 704.

In some embodiments, although not depicted in the example embodiment illustrated in FIG. 9, computer-implemented method 900 can further comprise applying, by the system (e.g., via quantum gate operation system 102 and/or transverse component 110), a transversal Hadamard operation to the shifted switched subsystem code to generate a rotated subsystem code (not illustrated in the figures). For example, as described above with reference to FIGS. 7A and 7B, transverse component 110 can apply (e.g., as described above with reference to FIGS. 1, 2, and 3) a transversal Hadamard operation to shifted switched subsystem code 704 to generate a rotated subsystem code (not illustrated in the figures).

In some embodiments, although not depicted in the example embodiment illustrated in FIG. 9, computer-implemented method 900 can further comprise rotating, by the system (e.g., via quantum gate operation system 102 and/or rotation component 202), the rotated subsystem code to generate a code that performs a fault tolerant logical Hadamard gate on a quantum code having a property of reducing at least one of: frequency collisions or crosstalk errors associated with a quantum device. For example, as described above with reference to FIGS. 7A and 7B, rotation component 202 can rotate (e.g., as described above with reference to FIGS. 1, 2, and 3) the rotated subsystem code to generate a code (not illustrated in the figures) that performs a fault tolerant logical Hadamard gate on a quantum code having a property of reducing at least one of frequency collisions or crosstalk errors associated with a quantum device.

Quantum gate operation system 102 can be associated with various technologies. For example, quantum gate operation system 102 can be associated with quantum computing technologies, quantum hardware and/or software technologies, quantum gate scheduling technologies, quantum algorithm technologies, machine learning technologies, artificial intelligence technologies, cloud computing technologies, and/or other technologies.

Quantum gate operation system 102 can provide technical improvements to systems, devices, components, operational steps, and/or processing steps associated with the various technologies identified above. For example, quantum gate operation system 102 can: apply a gauge fixing operation to a subsystem code of an encoded qubit to generate a switched subsystem code; apply a transversal Hadamard operation to the switched subsystem code to generate a rotated subsystem code; and/or rotate the rotated subsystem code to generate a code that performs a fault tolerant logical Hadamard gate on a quantum code having a property of reducing at least one of: frequency collisions or crosstalk errors associated with a quantum device (e.g., a quantum processor and/or a quantum computer that executes the code and/or the quantum code).

Quantum gate operation system 102 can provide technical improvements to a processing unit (e.g., processor 106, a quantum processor, and/or another processor) associated with quantum gate operation system 102. For example, as described above, quantum gate operation system 102 can: apply a gauge fixing operation to a subsystem code of an encoded qubit to generate a switched subsystem code; apply a transversal Hadamard operation to the switched subsystem code to generate a rotated subsystem code; and/or rotate the rotated subsystem code to generate a code that performs a fault tolerant logical Hadamard gate on a quantum code having a property of reducing at least one of: frequency collisions or crosstalk errors associated with a quantum device (e.g., a quantum processor and/or a quantum computer that executes the code and/or the quantum code). In this example, quantum gate operation system 102 can thereby reduce at least one of frequency collisions or crosstalk errors associated with a quantum device such as, for example, a quantum processor that executes such code and/or such quantum code. In this example, by reducing at least one of frequency collisions or crosstalk errors associated with, for instance, a quantum processor that executes such code and/or such quantum code, quantum gate operation system 102 can thereby improve at least one of performance, accuracy, and/or fidelity associated with the quantum processor, as well as reduce computational costs associated with the quantum processor.

A practical application of quantum gate operation system 102 is that it can be implemented using a quantum computing device (e.g., a quantum processor and/or a quantum computer) to generate a code that performs a fault tolerant logical Hadamard gate on a quantum code to compute one or more solutions (e.g., heuristic(s)) to a variety of problems ranging in complexity (e.g., an estimation problem, an optimization problem, and/or another problem) in a variety of domains (e.g., finance, chemistry, medicine, and/or another domain). For example, a practical application of quantum gate operation system 102 is that it can be implemented using a quantum computing device (e.g., a quantum processor and/or a quantum computer) to generate a code that performs a fault tolerant logical Hadamard gate on a quantum code to compute one or more solutions (e.g., heuristic(s)) to an estimation problem and/or an optimization problem in the domain of chemistry, medicine, and/or finance, where such a solution can be used to engineer, for instance, a new chemical compound, a new medication, and/or a new option premium.

It should be appreciated that quantum gate operation system 102 provides a new approach driven by relatively new quantum computing technologies. For example, quantum gate operation system 102 provides a new approach to generate a code that performs a fault tolerant logical Hadamard gate on a quantum code (e.g., a subsystem code such as, for instance, a heavy-hexagon code).

Quantum gate operation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Quantum gate operation system 102 and/or components thereof, can be employed to solve new problems that arise through advancements in technologies mentioned above, employment of quantum computing systems, cloud computing systems, computer architecture, and/or another technology.

It is to be appreciated that quantum gate operation system 102 can utilize various combinations of electrical components, mechanical components, and circuitry that cannot be replicated in the mind of a human or performed by a human, as the various operations that can be executed by quantum gate operation system 102 and/or components thereof as described herein are operations that are greater than the capability of a human mind. For instance, the amount of data processed, the speed of processing such data, or the types of data processed by quantum gate operation system 102 over a certain period of time can be greater, faster, or different than the amount, speed, or data type that can be processed by a human mind over the same period of time.

According to several embodiments, quantum gate operation system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that quantum gate operation system 102 can include information that is impossible to obtain manually by an entity, such as a human user. For example, the type, amount, and/or variety of information included in quantum gate operation system 102, gauge fixing component 108, transverse component 110, rotation component 202, and/or lattice shift component 204 can be more complex than information obtained manually by a human user.

In some embodiments, quantum gate operation system 102 can be associated with a cloud computing environment. For example, quantum gate operation system 102 can be associated with cloud computing environment 1150 described below with reference to FIG. 11 and/or one or more functional abstraction layers described below with reference to FIG. 12 (e.g., hardware and software layer 1260, virtualization layer 1270, management layer 1280, and/or workloads layer 1290).

Quantum gate operation system 102 and/or components thereof (e.g., gauge fixing component 108, transverse component 110, rotation component 202, lattice shift component 204, and/or another component) can employ one or more computing resources of cloud computing environment 1150 described below with reference to FIG. 11 and/or one or more functional abstraction layers (e.g., quantum software) described below with reference to FIG. 12 to execute one or more operations in accordance with one or more embodiments of the subject disclosure described herein. For example, cloud computing environment 1150 and/or such one or more functional abstraction layers can comprise one or more classical computing devices (e.g., classical computer, classical processor, virtual machine, server, and/or another classical computing device), quantum hardware, and/or quantum software (e.g., quantum computing device, quantum computer, quantum processor, quantum circuit simulation software, superconducting circuit, and/or other quantum hardware and/or quantum software) that can be employed by quantum gate operation system 102 and/or components thereof to execute one or more operations in accordance with one or more embodiments of the subject disclosure described herein. For instance, quantum gate operation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, and/or another type of model); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
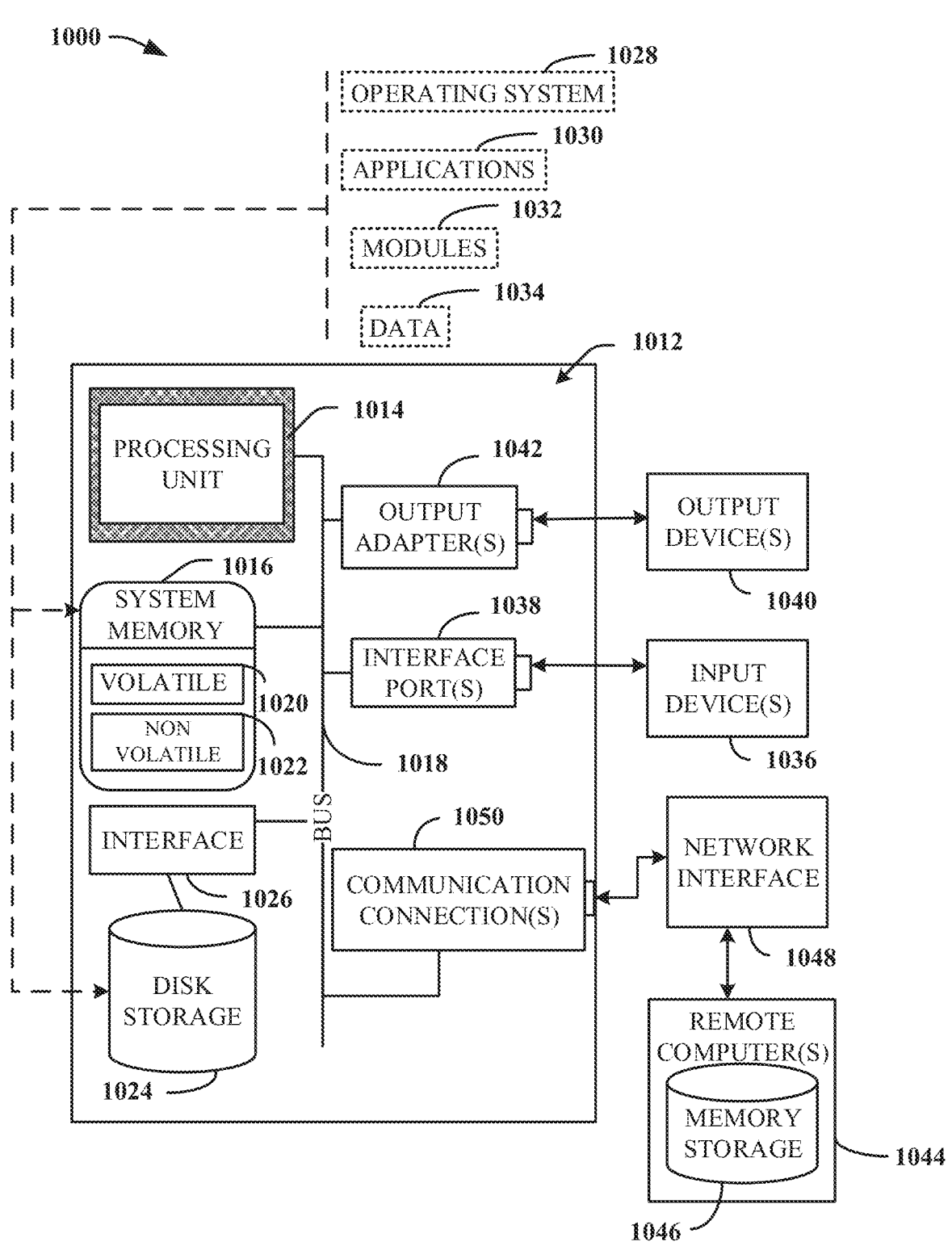
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, and/or another wire and/or wireless communication network. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection

1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
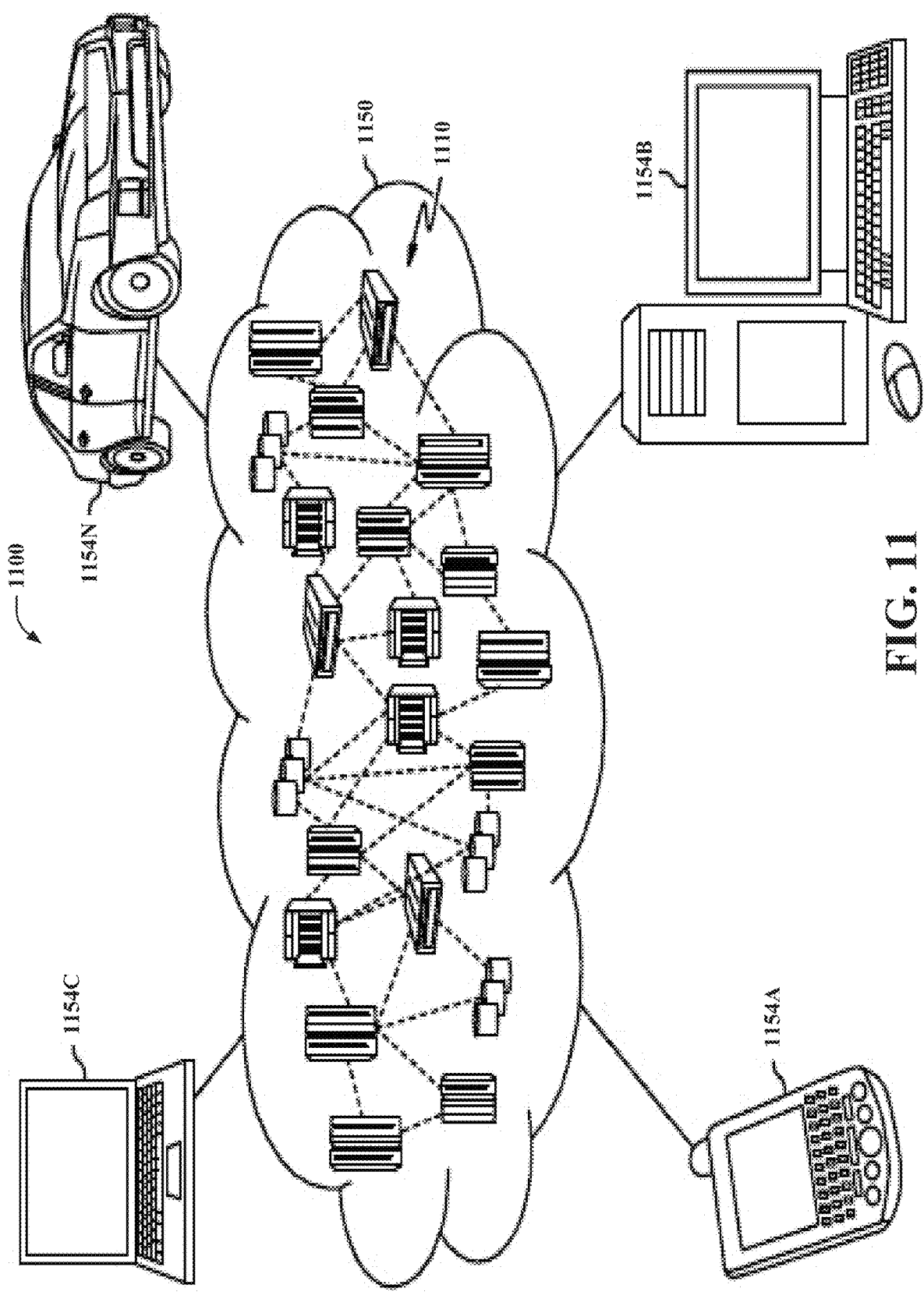
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Although not illustrated in FIG. 11, cloud computing nodes 1110 can further comprise a quantum platform (e.g., quantum computer, quantum hardware, quantum software, and/or another quantum platform) with which local computing devices used by cloud consumers can communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
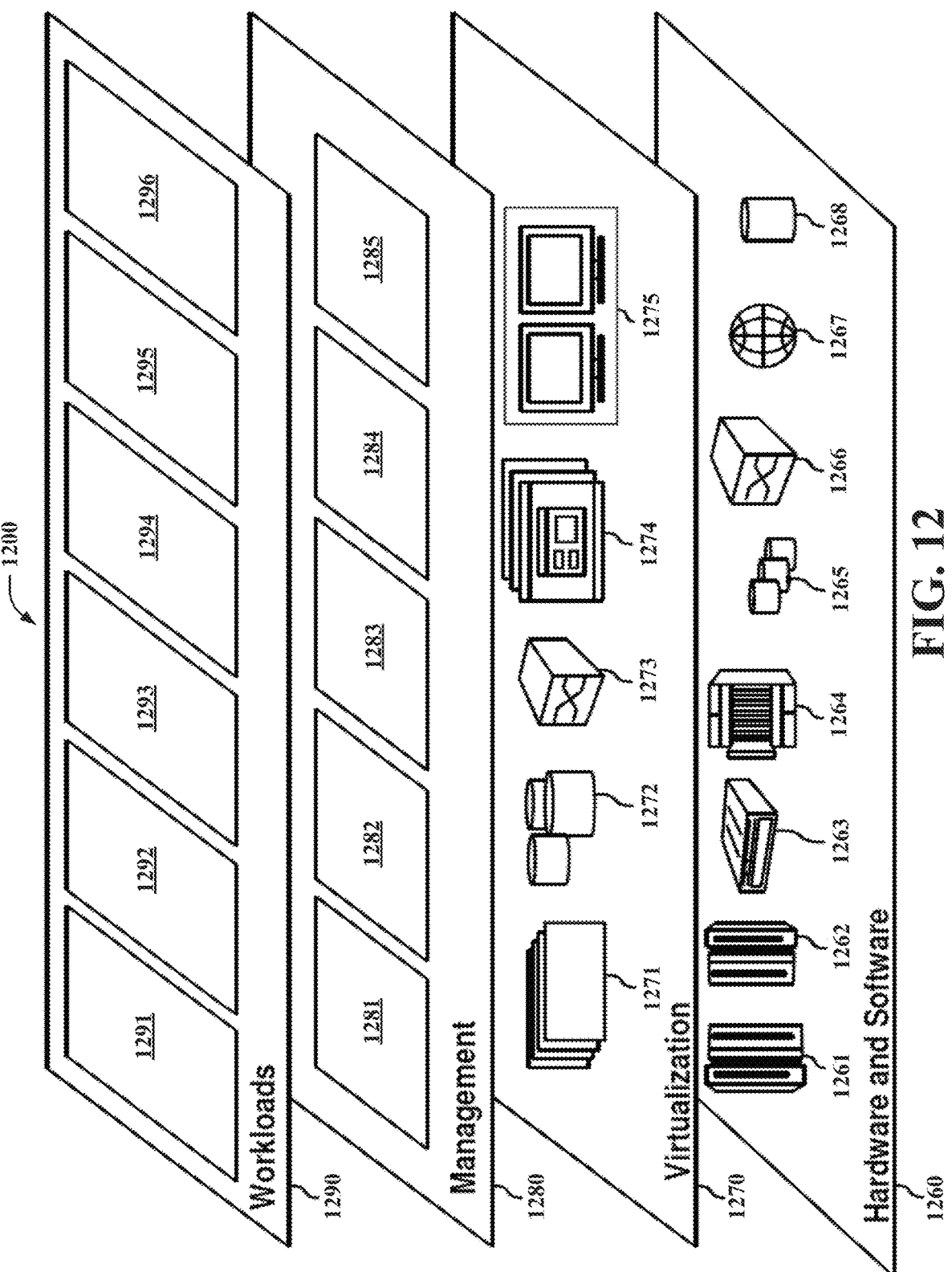
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267, database software 1268, quantum platform routing software (not illustrated in FIG. 12), and/or quantum software (not illustrated in FIG. 12).

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and quantum gate operation software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, and/or other program modules that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer executable components stored in memory, the computer executable components comprising:
a gauge fixing component that applies a gauge fixing operation to a subsystem code of an encoded qubit of a heavy hex lattice to generate a switched subsystem code;
a lattice shift component that shifts a lattice of the switched subsystem code downward such that a bottom row of the switched subsystem code occupies a newly added row of data qubits at a bottom of the lattice below a newly added row of ancillary qubits; and
a transverse component that applies a transversal Hadamard operation to the switched subsystem code to generate a rotated subsystem code, wherein the transverse component also applies the transversal Hadamard operation to the switched subsystem code to apply Hadamard gates on data qubits and to interchange: X type gauge operators and Z type gauge operators.

2. The system of claim 1, wherein the computer executable components further comprise:
a rotation component that rotates the rotated subsystem code ninety degrees to generate a code that performs a fault tolerant logical Hadamard gate on a quantum code having a property of reducing at least one of: frequency collisions or crosstalk errors associated with a quantum device.

3. The system of claim 2, wherein the rotation component performs two pairwise swap gate operations between qubits that are symmetric to one another with respect to a vertical axis and a diagonal axis in the rotated subsystem code.

4. The system of claim 1, wherein the gauge fixing component applies the gauge fixing operation to the subsystem code to interchange two-body gauge operators and four-body gauge operators in a subset of the subsystem code.

5. The system of claim 1, wherein the transverse component further applies the transversal Hadamard operation to the switched subsystem code to apply Hadamard gates on data qubits and to interchange: X type stabilizers and Z type stabilizers; and X type logical operators and Z type logical operators.

6. A computer-implemented method, comprising:
applying, by a system operatively coupled to a processor, a gauge fixing operation to a subsystem code of an encoded qubit of a heavy hex lattice to generate a switched subsystem code;
shifting, by the system, a lattice of the switched subsystem code downward such that a bottom row of the switched subsystem code occupies a newly added row of data qubits at a bottom of the lattice below a newly added row of ancillary qubits;
applying, by the system, a transversal Hadamard operation to the switched subsystem code to generate a rotated subsystem code; and
applying, by the system, the transversal Hadamard operation to the switched subsystem code to apply Hadamard gates on data qubits and to interchange: X type gauge operators and Z type gauge operators.

7. The computer-implemented method of claim 6, further comprising:
rotating, by the system, the rotated subsystem code to generate a code that performs a fault tolerant logical Hadamard gate on a quantum code having a property of reducing at least one of: frequency collisions or crosstalk errors associated with a quantum device.

8. The computer-implemented method of claim 7, further comprising:
performing, by the system, two pairwise swap gate operations between qubits that are symmetric to one another with respect to a vertical axis and a diagonal axis in the rotated subsystem code.

9. The computer-implemented method of claim 6, further comprising:
applying, by the system, the gauge fixing operation to the subsystem code to interchange two-body gauge operators and four-body gauge operators in a subset of the subsystem code.

10. The computer-implemented method of claim 6, further comprising:
applying, by the system, the transversal Hadamard operation to the switched subsystem code to apply Hadamard gates on data qubits and to further interchange: X type stabilizers and Z type stabilizers; and X type logical operators and Z type logical operators.

11. A computer program product comprising a computer readable storage medium having program instructions embodied therewith, the program instructions executable by a processor to cause the processor to:

apply a gauge fixing operation to a subsystem code of an encoded qubit of a heavy hex lattice to generate a switched subsystem code;

shift a lattice of the switched subsystem code downward such that a bottom row of the switched subsystem code occupies a newly added row of data qubits at a bottom of the lattice below a newly added row of ancillary qubits;

apply a transversal Hadamard operation to the switched subsystem code to generate a rotated subsystem code; and apply the transversal Hadamard operation to the switched subsystem code to apply Hadamard gates on data qubits and to interchange: X type gauge operators and Z type gauge operators.

12. The computer program product of claim 11, wherein the program instructions are further executable by the processor to cause the processor to:

rotate the rotated subsystem code ninety degrees to generate a code that performs a fault tolerant logical Hadamard gate on a quantum code having a property of reducing at least one of: frequency collisions or crosstalk errors associated with a quantum device.

13. The computer program product of claim 12, wherein the program instructions are further executable by the processor to cause the processor to:

perform two pairwise swap gate operations between qubits that are symmetric to one another with respect to a vertical axis and a diagonal axis in the rotated subsystem code.

14. The computer program product of claim 11, wherein the program instructions are further executable by the processor to cause the processor to:

apply the gauge fixing operation to the subsystem code to interchange two-body gauge operators and four-body gauge operators in a subset of the subsystem code.

15. The computer program product of claim 11, wherein the program instructions are further executable by the processor to cause the processor to:

apply the transversal Hadamard operation to the switched subsystem code to further apply Hadamard gates on data qubits and to interchange: X type stabilizers and Z type stabilizers; and X type logical operators and Z type logical operators.

16. A system, comprising:

a processor that executes computer executable components stored in memory, the computer executable components comprising:

a gauge fixing component that applies a gauge fixing operation to a subsystem code of an encoded qubit to generate a switched subsystem code;

a lattice shift component that shifts a lattice of the switched subsystem code to generate a shifted switched subsystem code, wherein the lattice shift component generates the shifted switched subsystem code by:

adding, to a bottom of the lattice, an additional row of ancillary qubits and an additional row of data qubits to;

shifting the switched subsystem code downward such that a bottom row of the switched subsystem code occupies the additional row of ancillary qubits; and shifting the switched subsystem code downward such that the bottom row of the switched subsystem code occupies the additional row of data qubits; and a transverse component that applies a transversal Hadamard operation to the shifted switched subsystem code to generate a rotated subsystem code, wherein the transverse component applies the transversal Hadamard operation to the shifted switched subsystem code to apply Hadamard gates on data qubits and to interchange: X type gauge operators and Z type gauge operators.

17. The system of claim 16, wherein the computer executable components further comprise:

a rotation component that rotates the rotated subsystem code to generate a code that performs a fault tolerant logical Hadamard gate on a quantum code having a property of reducing at least one of: frequency collisions or crosstalk errors associated with a quantum device.

18. The system of claim 17, wherein the transverse component further applies the transversal Hadamard operation to the shifted switched subsystem code to apply Hadamard gates on data qubits and to interchange: X type stabilizers and Z type stabilizers; and X type logical operators and Z type logical operators.

19. The system of claim 17, wherein the rotation component performs two pairwise swap gate operations between qubits that are symmetric to one another with respect to a vertical axis and a diagonal axis in the rotated subsystem code.

20. The system of claim 16, wherein the gauge fixing component applies the gauge fixing operation to the subsystem code to interchange two-body gauge operators and four-body gauge operators in a subset of the subsystem code.

21. A computer-implemented method, comprising:

applying, by a system operatively coupled to a processor, a gauge fixing operation to a subsystem code of an encoded qubit to generate a switched subsystem code;

shifting, by the system, a lattice of the switched subsystem code to generate a shifted switched subsystem code, wherein the shifting comprises:

adding, by the system, to a bottom of the lattice, an additional row of ancillary qubits and an additional row of data qubits to;

shifting, by the system, the switched subsystem code downward such that a bottom row of the switched subsystem code occupies the additional row of ancillary qubits; and shifting, by the system, the switched subsystem code downward such that the bottom row of the switched subsystem code occupies the additional row of data qubits; and applying, by the system, a transversal Hadamard operation to the shifted switched subsystem code to apply Hadamard gates on data qubits and to interchange: X type gauge operators and Z type gauge operators.

22. The computer-implemented method of claim 21, further comprising:

applying, by the system, the transversal Hadamard operation to the shifted switched subsystem code to generate a rotated subsystem code;

rotating, by the system, the rotated subsystem code to generate a code that performs a fault tolerant logical Hadamard gate on a quantum code having a property of reducing at least one of: frequency collisions or cross-talk errors associated with a quantum device.

23. The computer-implemented method of claim 22, further comprising:

applying, by the system, the transversal Hadamard operation to the shifted switched subsystem code to further apply Hadamard gates on data qubits and to interchange: X type stabilizers and Z type stabilizers; and X type logical operators and Z type logical operators.

24. The computer-implemented method of claim 22, further comprising:

performing, by the system, two pairwise swap gate operations between qubits that are symmetric to one another with respect to a vertical axis and a diagonal axis in the rotated subsystem code.

25. The computer-implemented method of claim 21, further comprising:

applying, by the system, the gauge fixing operation to the subsystem code to interchange two-body gauge operators and four-body gauge operators in a subset of the subsystem code.

\*     \*     \*     \*     \*